United States Patent [19]

Ohta et al.

[11] Patent Number: 4,843,224
[45] Date of Patent: Jun. 27, 1989

[54] IC CARD

[75] Inventors: Satoshi Ohta; Kouzi Tanagawa, both of Tokyo, Japan

[73] Assignee: Oki Electric Industry Co., Ltd., Tokyo, Japan

[21] Appl. No.: 206,415

[22] Filed: Jun. 6, 1988

[30] Foreign Application Priority Data

Jun. 12, 1987 [JP] Japan .............................. 62-89652[U]

[51] Int. Cl.⁴ ........................................... G06K 19/00
[52] U.S. Cl. .................................... 235/487; 235/492
[58] Field of Search ............................... 235/487, 492

[56] References Cited

U.S. PATENT DOCUMENTS 4,575,621 3/1986 Dreifus ........................... 235/487 X

FOREIGN PATENT DOCUMENTS 5389 1/1986 Japan .

Primary Examiner—Harold I. Pitts
Attorney, Agent, or Firm—Spencer & Frank

[57] ABSTRACT

In IC card with a built-in IC, comprising an external power supply terminal and a solar battery, the external power supply terminal is connected to an IC internal power supply line through a first switch, the solar battery is connected to the IC internal power supply line through a second switch, and a voltage detection circuit is connected to the external power supply terminal. When the voltage detection circuit detects a voltage on the external power supply terminal, it switches ON the first switch and switches OFF the second switch. When it does not detect a voltage on the external power supply terminal it switches OFF the first switch and switches ON the second switch.

5 Claims, 2 Drawing Sheets

IC CARD

BACKGROUND OF THE INVENTION

This invention relates to an IC card comprising a solar battery, a keyboard, a display unit, etc. Specifically, the the present invention relates to the configuration of a switching circuit between the external power supply terminal and the solar battery of the card, and relates to protection of the solar battery vulnerable to static electricity or the like.

An example of an IC card employing a solar battery, a keyboard and a display unit is disclosed in Japanese Patent Application Laid-open No. 1986/5389. FIG. 1A and FIG. 1B are front and rear perspective views showing such an IC card. This card comprises a solar battery or solar cell and a secondary battery, and thereby enable data input through the keyboard, processing of such data by means of the CPU and display of such data by means of the display unit. The keyboard may include a key for transaction (TR), a key for reference or inquiry (RE) and a key for start (ST).

Moreover, the IC card has an external terminal, so that it can be connected, for example, to a bank terminal, such as a teller machine, and thus can be used as an electronic pass book.

When the IC card connected to an external equipment such as a bank terminal, is used in an on-line mode the power for the IC, the display unit, etc. of the card is supplied from the external equipment through the external power supply terminal. When the card is used in an off-line mode, in which the card is not connected to an external equipment, the power for the IC, the display unit, etc. of the card is supplied from the internal solar battery of the card.

Therefore, the IC card normally employs a configuration in which the external power supply terminal is directly connected to the IC and the display unit of the card, and the solar battery is also directly connected to the IC and the display unit of the card and hence to the external power supply terminal.

However, the solar batteries, especially amorphous solar batteries which are widely being used recently, are vulnerable to reverse voltages, and particularly to static voltages. Therefore, the reverse withstand voltage against static electricity is at most of the order of a few tens of volts, which is extremely small compared with the voltage of a few hundred volts of ICs formed of monocrystalline silicon and having provision of protection against static electricity. In addition, it must also be considered that such cards may be used in an environment where static electricity is easy to occur. For example the cards are used as electronic pass books and inserted in a clothing pocket.

SUMMARY OF THE INVENTION

An object of the invention is to provide a protection for a solar buttery in an IC card against a static electricity or any other abnormal voltage which may appear on the external power supply terminal.

The present invention is characterized by a voltage detection circuit for detecting the voltage on the external power supply terminal, a first switch between the external power supply terminal and the IC internal power supply line, and a second switch between the solar battery and the IC internal power supply line, and then switching the first and the second switches ON and OFF depending upon the presence or absence of a voltage at the external power supply terminal as detected by the voltage detection circuit.

When a voltage is detected at the external power supply terminal, i.e., when the card is used in the on-line mode, the first switch is switched ON and the second switch is switched OFF. Therefore, power is supplied to the IC internal power supply line from the external equipment such as a bank terminal and the solar battery is isolated. When a voltage is not detected at the external power supply terminal, i.e., when the card is used in the off-line mode, the first switch is switched OFF and the second switch is switched ON.

Therefore, in this case, power is supplied to the IC internal power supply line from the solar battery and the external power supply terminal becomes isolated from the solar battery. There can be no damage to the card even if static electricity is generated at the external power supply terminal. In case of the on-line mode, the solar battery is isolated from the IC internal circuitry and the external power supply terminal, and is protected from any abnormal voltages which may appear on the external equipment.

DETAILED DESCRIPTION OF THE EMBODIMENTS

Figure 1A:
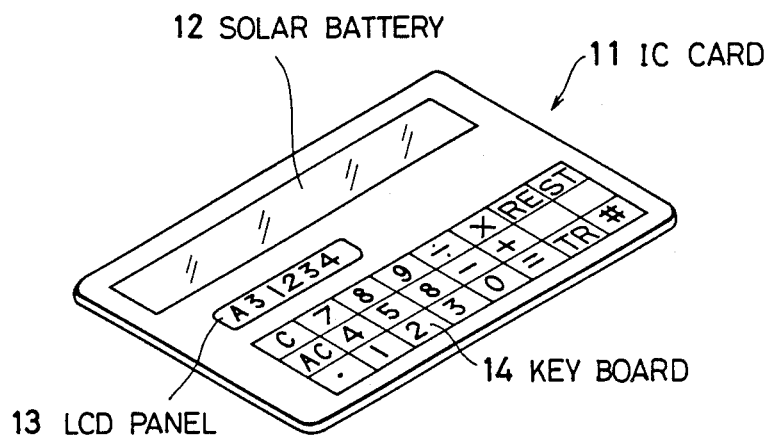
FIG. 1A and FIG. 1B are perspective views showing the front and the reverse surfaces of the prior art IC card.
Figure 1B:
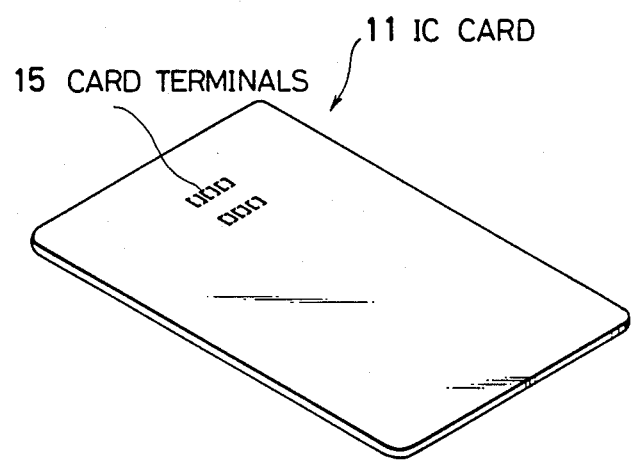

The external views of the IC card according to the invention can be identical to those of FIG. 1A and FIG. 1B.

Figure 2:
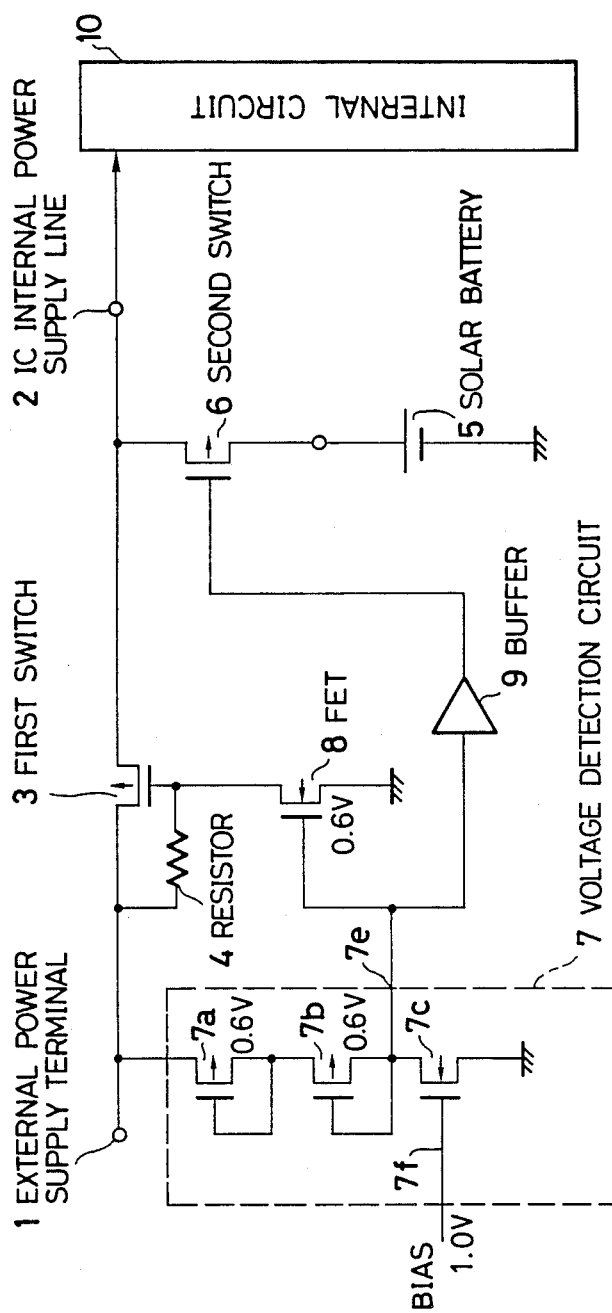
FIG. 2 is a circuit diagram of an embodiment of the circuit of the present invention.

FIG. 2 is a circuit diagram of an embodiment of the present invention. The IC card of this embodiment has an external power supply terminal 1, which is one of the six external terminals provided on the back surface of the IC card (FIG. 1B). A +5 V power supply voltage is supplied through this terminal when the card is connected to an external equipment such as a bank terminal.

A first switch 3 is connected between the external power supply terminal 1 and an IC internal power supply line 2. The IC internal power supply line 2 supplies power to an internal circuit 10 including a CPU, memory, etc. of the card. This switch 3 is preferably a p-channel MOSFET having its source connected to the external power supply terminal 1, and having its drain connected to the internal power supply line 2. The source and the gate of this MOSFET are connected together through resistor 4.

An n-channel MOS FET 8 is provided, with its drain connected to the gate of the p-channel MOS FET 3 and its source grounded.

A second switch 6 is connected between the IC internal power supply line 2 and the solar battery 5. The second switch 6 is also preferably a p-channel MOSFET having its source connected to the solar battery 5 and having its drain connected to the internal power supply line 2. The solar battery 5 is formed of amorphous silicon and is of a two- to three-layer configuration, and generates a voltage of 1.5 V to 2.0 V in daylight.

A voltage detection circuit 7 is connected to the external power supply terminal 1 and its output is connected to the first switch 3 through FET 8 and to the second switch 6 through a buffer 9. The threshold voltage of the voltage detection circuit 7 is set at about 1.8 V in this embodiment. The voltage detection circuit 7 therefore produces an output of "High" level when it detects a voltage higher than 1.8 V on the external power supply terminal 1 and produces an output of "Low" level when it does not detect a voltage higher than 1.8 V on the external power supply terminal 1.

The n-channel MOS FET 8 receives the output of the voltage detection circuit 7 at its gate and is turned on when the output of the voltage detection circuit 7 is "High" thereby to turn on the p-channel MOS FET 3.

The MOS FET 6 receives, through the buffer 9, the output of the voltage detection circuit to be turned on when the output of the voltage detection circuit 7 is "High".

The voltage detection circuit 7 of the illustrated example comprises a series connection of a plurality of, e.g., two, p-channel MOS FETs 7a and 7b. The source of the p-channel MOS FET 7a at one end of the series connection is connected to the external power supply terminal 1. The drain of the p-channel MOS FET 7b at the other end of the series connection is connected to an output terminal 7e of the voltage detection circuit. Each of the p-channel MOS FETs 7a and 7b has its gate connected to its drain.

The volgate detection circuit 7 further comprises an n-channel MOS FET 7c having its drain connected to the other end of the series connection, having its source grounded, and having its gate connected to a terminal 7f to receive a fixed bias voltage supplied from the internal circuit 10. The FET 7c acts as load means which allows a constant current through its drain-source circuit in accordance with a fixed bias voltage, e.g., 1.0 V.

When the voltage level at the external power supply terminal 1 is higher than 1.8 V, FET 8 becomes ON and the first switch 3 turns ON as well, i.e., goes to a conducting state. At the same time, the output of buffer 9 becomes "High" turning the second switch 6 OFF, and therefore the solar battery becomes isolated from the external power supply terminal 1.

When the voltage level at the external power supply terminal is less than 1.8 V, FET 8 becomes OFF, thus switching OFF the first switch 3. At the same time, the output of the buffer 9 becomes "Low", turning the second switch 6 ON and setting it to a conducting state. In this case, the solar battery 5 supplies a voltage of 1.5 to 2.0 V to IC 2 and also becomes isolated from the external power supply terminal 1.

The above mentioned circuit configuration protects the solar battery from static electricity and other abnormal voltages which may appear on the external power supply terminal 1, which is exposed. This is accomplished by switching OFF the first switch 3 in the off-line mode and by switching OFF the second switch 6 in the on-line mode.

The circuit components of the above mentioned circuit, i.e., the voltage detection circuit 7, the first switch 3, the second switch 6, the FET 8, the resistor 4, and the inverter 9 are all integrated on the same semiconductor chip with the internal circuit 10 including the CPU and memory. Therefore, the first switch 3, the second switch 6 etc. can be manufactured by ordinary semiconductor processes to have a withstand voltage of several hundred volts against static electricity.

As described above, this invention relates to an IC card comprising an IC, a solar battery, and an external power supply terminal. It also includes a voltage detection circuit connected to the external power supply terminal to turn ON and OFF a first and a second swtiches connected to the solar battery, depending upon the results of the detection of voltage.

Therefore, this invention provides protection, with the use of an extremely simple circuit, the solar battery from static and other abnormal voltage that may be generated on the external terminal of IC card.

In addition, the IC card of this invention also prevents application to the solar battery 5 of DC 5 V voltages supplied from external equipment in case of the on-line operation of the card, and thus prevents the degradation of the solar battery.

What is claimed is:

1. An IC card with a built-in IC, comprising
   an external power supply terminal,
   a solar battery,
   a first swith connecting said external power supply terminal to an IC internal power supply line,
   a second switch connecting said solar battery to said IC internal power supply line, and
   a voltage detection circuit connected to said external power supply terminal,
   wherein when said voltage detection circuit detects a voltage on said external power supply terminal, it switches ON the first switch and switches OFF the second switch, and when said voltage detection circuit does not detect a voltage on the external power supply terminal it switches OFF the first switch and switches ON the second switch.

2. An IC card according to claim 1, wherein
   said first switch comprises a p-channel MOS FET having its source connected to the external power supply terminal, having its drain connected to the internal power supply line, and having its gate connected through a resistor to the source,
   said IC card further comprises an n-channel MOS FET having its drain connected to the gate of the p-channel MOS FET and having its source grounded,
   said voltage detection circuit produces an output of "High" level when it detects a voltage on said external power supply terminal and produces an output of "Low" level when it does not detect a voltage on said external power supply terminal, and
   said n-channel MOS FET is connected to receive the output of the voltage detection circuit at its gate and to be turned on when the output of the voltage detection circuit is "High" thereby to turn on the p-channel MOS FET.

3. An IC card according to claim 2, wherein
   said second switch comprises a p-channel MOS FET having its source connected to the solar battery and having its drain connected to the internal power supply line and having its gate connected to receive the output of the voltage detection circuit to be turned off when the output of the voltage detection circuit is "High".

4. An IC card according to claim 1, wherein the voltage detection circuit comprises a series connection of p-channel MOS FETs having a source of the p-channel MOS FET at one end of the series connection connected to the external power supply terminal and having a drain of the p-channel MOS FET at the other end of the series connection connected to an output terminal of the voltage detection circuit, and each of the p-channel MOS FETs has its gate connected to its drain.

5. An IC card according to claim 4, wherein said voltage detection circuit further comprises an n-channel MOS FET having its drain connected to said other end of the series connection, having its source grounded, and having its gate connected to receive a fixed bias voltage.

* * * * *